Oct. 10, 1961 H. E. SHANKS ET AL 3,004,259
ELECTRICALLY VARIABLE WAVEGUIDE SLOT WITH
LONGITUDINAL POLARIZATION
Filed July 21, 1958
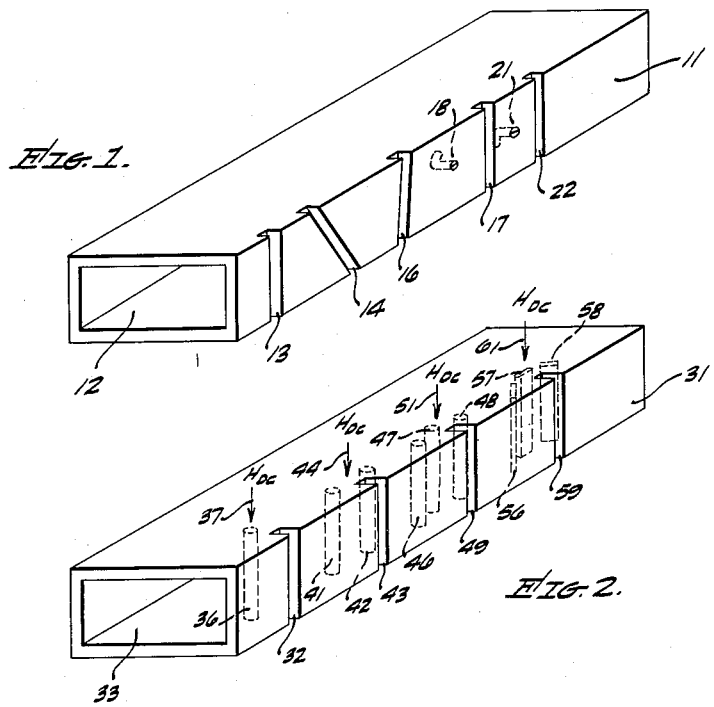
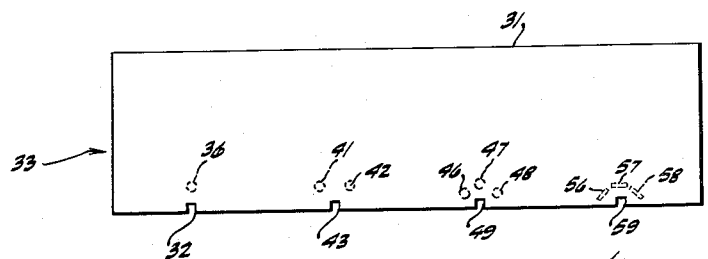
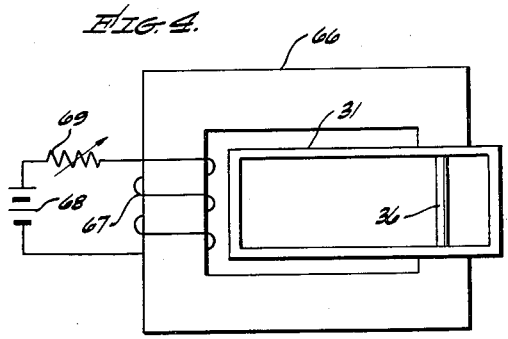
INVENTORS.
HOWARD E. SHANKS,
BERNARD J. MAXUM,
BY Robert D. Clay
ATTORNEY.

United States Patent Office 3,004,259
Patented Oct. 10, 1961

3,004,259
ELECTRICALLY VARIABLE WAVEGUIDE SLOT WITH LONGITUDINAL POLARIZATION
Howard E. Shanks, South Pasadena, Calif., and Bernard J. Maxum, Seattle, Wash., assignors to Hughes Aircraft Company, Culver City, Calif., a corporation of Delaware
Filed July 21, 1958, Ser. No. 749,732
5 Claims. (Cl. 343—746)

The present invention relates to variable conductance waveguides slots and more particularly to an electrically variable slot with longitudinal polarization of radiation.

It is well known that transverse slots in the narrow wall of a rectangular waveguide do not normally radiate when energy is propagated through the waveguide in the dominant mode. The reason for this is that the current distribution within the waveguide is parallel to the slot. In order to obtain radiation from a transverse slot in the narrow wall of a rectangular waveguide, it is necessary to incline the slot from the transverse position so that a component of the current is transverse to the narrow dimension of the slot. With such arrangement, the resulting radiation from the slot is parallel to the longitudinal axis of the waveguide.

Also, a transverse slot in the narrow wall of a rectangular waveguide can be made to radiate by inserting a bent probe into the waveguide adjacent to the slot. With this arrangement, the angle of the bent portion of the probe with respect to the electric field of the propagated energy determines the amplitude of the radiation. A phase reversal of the energy radiated from the slot may be obtained by a 180 degree change in the position of the bent portion of the probe.

The former arrangement is fixed and while the latter is variable the presence of a screw head adjustment adjacent the slot sometimes introduces undesirable impedance characteristics. Various arrangements have been proposed for overcoming this, but still require moving elements and tedious mechanical adjustments.

In accordance with the present invention, transverse slots in the narrow wall of the rectangular waveguide are made to radiate by mounting one or more stubs of ferrite material within the waveguide in the vicinity of the slot and parallel thereto. Only when a static magnetic field is applied to such stubs does the slot radiate and the amplitude of this radiation is determined by the magnitude of the magnetization. With this arrangement, the magnetized stubs disturb the symmetry of the current distribution by a mode conversion so that higher order modes are present in the area of the slot and such modes have components of current which are transverse to the slot. Thus, the control of radiation is readily accomplished by control of the magnetic field which, in turn, may be easily varied by the amount of excitation of an associated electromagnet.

It is therefore an object to provide a variable conductance transverse slot in the narrow wall of a rectangular waveguide.

Another object is to provide a variable conductance slot in the narrow wall of a rectangular waveguide requiring no moving parts.

Still another object is to provide an electrically variable conductance waveguide slot having radiation polarized in the direction parallel to the longitudinal axis of the waveguide.

A further object is to provide an electrically controlled variable conductance waveguide slot antenna array adapted for multipattern radiation without moving parts.

Other objects and advantages of the device of the present invention will be apparent in the following description and claims considered together with the accompanying drawing in which:

FIG. 1 is a perspective view of a sectional waveguide showing several types of narrow wall slots;

FIG. 2 is a perspective view of a section of rectangular waveguide having narrow wall slots in accordance with the present invention;

FIG. 3 is a plan view of the invention illustrated in FIG. 2; and

FIG. 4 is an end view of the invention of FIGS. 2 and 3 with magnetic field structure illustrated.

Referring to FIG. 1 in detail there is illustrated a section of rectangular waveguide 11 for propagation of microwave energy. As energy is propagated in the dominant mode $TE_{10}$ through waveguide 11 from input port 12, which may be connected to a source (not shown) of such energy in any conventional manner, a vertical slot 13 of a narrow wall of the waveguide does not radiate. For such a narrow wall waveguide slot to radiate energy it is necessary that current of the propagated energy have a component that is transverse to the slot and such component does not exist with respect to the narrow dimension of the vertical slot 13 for the dominant mode because current distribution in the area of the slot is parallel to the long dimension thereof.

Since current for the dominant mode is parallel to vertical slot 13 a slot 14 may be inclined in the narrow wall of the waveguide 11 so that a component of the current distribution is transverse to the slot. Under such circumstance slot 14 radiates with an intensity dependent upon the angle of inclination with respect to the vertical. It is to be noted that a slot 16 having a reverse inclination with respect to that of slot 14 radiates with a reversal in phase because the transverse component of current is in the opposite direction.

Another system for obtaining radiation from a narrow wall slot 17 of waveguide 11 is shown in FIG. 1 and comprises a rotatable bent probe 18 inserted through the narrow wall adjacent to the slot. In this system the amplitude of radiation is varied by changing the angular relation between the bent portion of the probe 18 and the electric field of the propagated energy which thereby alters the current distribution so that a component of current is transverse to the narrow dimension of the slot. With the bent portion of probe 18 directed vertically upward the field coupling is such that the transverse component of current crosses slot 17 in one direction, whereas, with the bent portion of a similar probe 21 directed vertically downward the field coupling is such that current crosses slot 22 in the opposite direction. Thus, by mechanically altering the relation between bent probes 18, 21 and thereby the field distribution of the propagated energy, slots 17 and 22 respectively radiate with a phase reversal.

In each of the foregoing instances it is to be noted that the polarization of energy radiated from the slots 14, 16, 17 and 22 is parallel to the longitudinal axis of waveguide 11. Also, the two inclined slots 14 and 16 are not adjustable but must be predetermined and then cut to provide desired radiation. With respect to the two probe-fed slots 17 and 22, it is to be noted that the probes 18 and 21 may be mechanically changed to alter radiation from the slots; however, as set forth previously, the screw heads of the probes may introduce undesirable impedance effects.

In accordance with the present invention, a rectangular waveguide 31 has a slot 32 through a narrow wall transverse to the broad walls. When energy is propagated in the dominant mode through waveguide 31 from input port 33, there is no radiation of energy from transverse slot 32 without the insertion of a disturbance of the current distribution within the waveguide. To accomplish such disturbance, at least one cylindrical ferrite stub 36 is mounted parallel to and in the immediate area of the slot 32 between the broad walls of the waveguide 31. The position of the stub 36 with respect to slot 32 is not critical, but should be sufficiently distant from the narrow wall of the waveguide 31 to convert the mode of energy propagation at the slot to higher order modes having components of current transverse to the slot when a static magnetic field $H_{DC}$, indicated by arrow 37, is established longitudinally through the stub 36. With the foregoing structure the slot 32 does not radiate when there is no magnetization of the stub 36; however, the slot does radiate when the stub is magnetized, and the amplitude of the radiation is dependent upon the value of the magnetization.

Various other stub arrangements have been found for making narrow wall slots radiate in a variable manner similar to that discussed in the foregoing paragraphs. Thus, as shown in FIG. 2, two cylindrical ferrite stubs 41 and 42 are transversely mounted in waveguide 31 parallel to slot 43 with one adjacent to each side of the slot. Again, the stubs 41 and 42 are spaced inwardly from the narrow wall of the waveguide 31 and convert the dominant mode of propagated energy to higher order modes when a static magnetic field $H_{DC}$, indicated by arrow 44, is established longitudinally through the stubs.

Also, more than two stubs may be used as indicated by the arrangement of three cylindrical ferrite stubs 46, 47, and 48 adjacent narrow wall slot 49 of FIG. 2. In this arrangement, the stubs 46, 47 and 48 are symmetrically clustered in a semicircle adjacent to slot 49 and are mounted parallel to the slot between the broad walls of the waveguide 31. Thus, when a static magnetic field $H_{DC}$, indicated by arrow 51, is established longitudinally through the stubs, the dominant mode of propagated energy is converted to higher order modes having components of current transverse to slot 49 so that the slot radiates.

With respect to the foregoing, the stubs have been illustrated and described as cylindrical; however, as shown in FIG. 2, rectangular ferrite stubs 56, 57 and 58 may be mounted in waveguide 31 with respect to slot 59 in a manner similar to that described for cylindrical stubs 46, 47 and 48. With a static magnetic field $H_{DC}$, indicated by arrow 61, established longitudinally through the stubs 56, 57 and 58 the slot 59 radiates in the same manner as previously described.

The necessary static magnetic field $H_{DC}$ for magnetizing the ferrite stubs of the arrangements described above may be readily established by any of the well known structures, such as movable permanent magnets, but preferably by electrically controllable solenoids or electromagnets, as illustrated in FIG. 4. Thus, in accordance with the invention a magnet yoke 66 is disposed about waveguide 31 with pole pieces adjacent to the ends of the ferrite stub 36. A coil 67 is suitably mounted on the yoke 66 and is energized by a conventional variable power source, as indicated by battery 68 in series-circuit arrangement with variable resistor 69.

Thus, there is provided a narrow wall variable conductance waveguide slot coupler and the radiation of energy from the slot is parallel to the longitudinal axis of the waveguide. It is also to be noted that a plurality of suitably spaced narrow wall slots electrically controlled in accordance with the present invention may be readily used as a multipattern antenna array where uniphase operation is desired and where polarization of the radiated energy parallel to the longitudinal axis of the waveguide feed is required.

While the salient features of the present invention have been described in detail with respect to a particular embodiment, it will be readily apparent that numerous modifications may be made within the spirit and scope of the invention, and it is therefore not desired to limit the invention to the exact details shown, except insofar as they may be defined in the following claims.

We claim:

1. A variable coupler for microwave energy comprising a rectangular waveguide for propagating microwave energy in a dominant mode and having a resonant slot extended transversely across a narrow wall, at least one ferrite stub mounted in said waveguide parallel and adjacent to said slot, and means for providing a static magnetic field through said stub parallel to said slot for converting said dominant mode to higher order modes with components of current transverse to the narrow dimension of said slot and making said slot radiate energy polarized parallel to the longitudinal axis of said waveguide.

2. A variable coupler for microwave energy comprising a rectangular waveguide for propagating microwave energy in a dominant mode and having a resonant slot extended transversely across a narrow wall, at least one ferrite stub mounted in said waveguide parallel and adjacent to said slot, and electrically controllable magnetic field means for establishing a static magnetic field through said stub parallel to said slot for converting said dominant mode to higher order modes at said slot to cause said slot to radiate energy polarized parallel to the longitudinal axis of said waveguide.

3. A variable coupler for microwave energy comprising a rectangular waveguide for propagating microwave energy in a dominant mode and having a resonant slot extended transversely across a narrow wall between broad walls, at least one ferrite stub mounted between broad walls in said waveguide parallel and adjacent to said slot, magnetic field means for establishing a static magnetic field through said stub parallel to said slot for converting said dominant mode to higher modes in the area of said slot to cause said slot to radiate energy polarized parallel to the longitudinal axis of said waveguide, and electrically variable means coupled to said magnetic field means for varying the value of said static magnetic field to alter the amplitude of radiation from said slot.

4. The combination of claim 3 wherein a plurality of ferrite stubs are symmetrically disposed adjacent and parallel to said slot in said waveguide between the broadwalls.

5. A uniphase and multipattern antenna array comprising a section of rectangular waveguide for propagating microwave energy in a dominant mode and having a plurality of spaced-apart resonant slots extended transversely across a narrow wall, a plurality of ferrite stubs with at least one mounted in said waveguide adjacent to each of said slots parallel thereto, and separate electrically controllable magnetic field means for establishing a static magnetic field through said stubs at each of said slots for independently controlling the amplitude of energy radiated from said slots.

References Cited in the file of this patent

UNITED STATES PATENTS

| | | |
|---|---|---|
| 2,574,433 | Clapp | Nov. 5, 1951 |
| 2,597,144 | Clapp | May 20, 1952 |
| 2,704,327 | Chandler | Mar. 15, 1955 |
| 2,773,256 | Ford et al. | Dec. 4, 1956 |
| 2,808,584 | Kock | Oct. 1, 1957 |
| 2,903,656 | Weisbaum | Sept 8, 1959 |